United States Patent Office.

CHARLES VOLKMAR, JR., OF NEW YORK, N. Y., ASSIGNOR TO HIMSELF, WILLIAM P. MYERS, AND THOMAS HEDIEM, OF BALTIMORE, MARYLAND.

Letters Patent No. 70,920, dated November 12, 1867.

IMPROVED MODE OF PREPARING CLOTH FOR RECEIVING LITHOGRAPHIC AND OTHER IMPRESSIONS.

The Schedule referred to in these Letters Patent and making part of the same.

TO ALL WHOM IT MAY CONCERN:

Be it known that I, CHARLES VOLKMAR, Jr., of New York, in the county of New York, and in the State of New York, have invented a new and improved Process for Preparing Cloth for Receiving Lithographic, Photographic, and other Impressions; and I do hereby declare that the following is a full, clear, and exact description thereof.

This invention consists in a new process of preparing muslin or linen for lithographic or other printing purposes.

To enable others skilled in this branch to understand my invention, I will proceed to describe it.

I take the white of eggs, and combine with it a sufficient quantity of the oxide of zinc, or argillaceous or calcareous or argillo-calcareous earths, either separately or combined, to form a pigment of the proper consistence. This is applied to the woven fabric, after which the same is immersed in boiling water, and so rendered insoluble. After being coagulated in this or any other manner, a sizing of glue is applied to it, after which it is calendered.

Having thus described my invention, what I claim as new, and desire to secure by Letters Patent, is—

The process for preparing cloth for receiving lithographic, photographic, or other impressions, substantially as described.

In testimony that I claim the above-described improved process for preparing cloth for receiving lithographic, photographic, and other impressions, I have hereunto signed my name this 22d day of August, 1867.

CHS. VOLKMAR, Jr.

Witnesses:
THOMAS HEDIEM,
CHAS. HERRON.